US007200811B1

(12) United States Patent
Takashima

(10) Patent No.: US 7,200,811 B1
(45) Date of Patent: Apr. 3, 2007

(54) FORM PROCESSING APPARATUS, FORM PROCESSING METHOD, RECORDING MEDIUM AND PROGRAM

(75) Inventor: Keiichi Takashima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 447 days.

(21) Appl. No.: 10/627,614

(22) Filed: Jul. 28, 2003

(30) Foreign Application Priority Data

Jul. 30, 2002 (JP) ............................. 2002-221821
Jul. 30, 2002 (JP) ............................. 2002-221822

(51) Int. Cl.
*G06F 17/00* (2006.01)

(52) U.S. Cl. ...................... 715/517; 715/507; 715/508; 715/523; 715/524

(58) Field of Classification Search ................ 715/517, 715/513, 507, 505, 501.1, 506, 508, 523, 715/524; 707/10; 709/245, 238, 229
See application file for complete search history.

(56) References Cited

U.S. PATENT DOCUMENTS

| 5,008,810 | A | * | 4/1991 | Kessel et al. ................ 715/506 |
| 5,025,396 | A | * | 6/1991 | Parks et al. ................. 715/506 |
| 5,231,579 | A | * | 7/1993 | Tsuchiya et al. ............ 715/508 |
| 5,404,294 | A | * | 4/1995 | Karnik ........................ 715/507 |
| 5,563,998 | A | * | 10/1996 | Yaksich et al. ............. 715/507 |
| 5,619,635 | A | * | 4/1997 | Millman et al. ............ 715/530 |
| 5,704,029 | A | * | 12/1997 | Wright, Jr. .................. 715/505 |
| 5,745,712 | A | * | 4/1998 | Turpin et al. ............... 715/763 |
| 5,794,259 | A | | 8/1998 | Kikinis ....................... 707/507 |
| 5,991,469 | A | * | 11/1999 | Johnson et al. ............. 382/317 |
| 5,991,782 | A | * | 11/1999 | Miyagawa et al. ......... 715/513 |
| 6,088,700 | A | * | 7/2000 | Larsen et al. ............... 707/10 |
| 6,167,523 | A | * | 12/2000 | Strong ........................ 726/21 |
| 6,185,583 | B1 | * | 2/2001 | Blando ........................ 715/507 |
| 6,192,380 | B1 | * | 2/2001 | Light et al. ................. 715/505 |
| 6,199,079 | B1 | | 3/2001 | Gupta et al. ................ 707/507 |
| 6,460,042 | B1 | * | 10/2002 | Hitchcock et al. ............ 707/10 |
| 6,525,749 | B1 | * | 2/2003 | Moran et al. ............... 715/863 |

(Continued)

FOREIGN PATENT DOCUMENTS

WO    WO 01/37170 A2    5/2001

OTHER PUBLICATIONS

A. Girgensohn et al.,"Dynamic Forms: An Enhanced Interaction Abstraction Based on Forms", Jun. 27-29, 1995, Conf. on Human-Computer Interaction, IFIP Conference Proceedings Chapman & Hall 1995, pp. 362-367.*

(Continued)

*Primary Examiner*—Heather R. Herndon
*Assistant Examiner*—James H Blackwell
(74) *Attorney, Agent, or Firm*—Fitzpatrick, Cella, Harper & Scinto

(57) ABSTRACT

There is provided a form processing method enabling overlaying of field data without processing the field data, in form processing for overlaying field data onto a field in a form. In particular, the form processing method includes a step of setting an input picture for each of the fields as field attribute information, the input picture being composed of characters indicating a format of field data to be overlaid. In the method, picture words are cut (step S305) based on the input picture and field data words are cut (step S306), and the field data is overlaid onto a field (step S312).

2 Claims, 20 Drawing Sheets

U.S. PATENT DOCUMENTS

| | | | |
|---|---|---|---|
| 6,589,290 B1 * | 7/2003 | Maxwell et al. | 715/507 |
| 6,651,217 B1 * | 11/2003 | Kennedy et al. | 715/507 |
| 6,658,622 B1 * | 12/2003 | Aiken et al. | 715/507 |
| 6,662,340 B2 * | 12/2003 | Rawat et al. | 715/507 |
| 6,718,332 B1 * | 4/2004 | Sitaraman et al. | 707/102 |
| 6,826,597 B1 * | 11/2004 | Lonnroth et al. | 709/207 |
| 6,854,085 B1 * | 2/2005 | Morse | 715/507 |
| 6,944,669 B1 * | 9/2005 | Saccocio | 709/229 |
| 6,964,010 B1 * | 11/2005 | Sharp | 715/507 |
| 2001/0047426 A1 * | 11/2001 | Hunter | 709/238 |
| 2001/0047428 A1 * | 11/2001 | Hunter | 709/245 |
| 2002/0013788 A1 * | 1/2002 | Pennell et al. | 707/507 |
| 2002/0184255 A1 * | 12/2002 | Edd et al. | 707/500 |
| 2003/0023625 A1 * | 1/2003 | Thomason | 707/505 |
| 2003/0046316 A1 * | 3/2003 | Gergic et al. | 707/513 |
| 2003/0078949 A1 * | 4/2003 | Scholz et al. | 707/505 |
| 2003/0159071 A1 * | 8/2003 | Martinez et al. | 713/202 |
| 2004/0034833 A1 * | 2/2004 | Kougiouris et al. | 715/513 |
| 2004/0039993 A1 * | 2/2004 | Kougiouris et al. | 715/513 |
| 2004/0148568 A1 * | 7/2004 | Springer | 715/513 |
| 2004/0205530 A1 * | 10/2004 | Borg | 715/507 |
| 2004/0205533 A1 * | 10/2004 | Lopata et al. | 715/507 |
| 2005/0149854 A1 * | 7/2005 | Pennell et al. | 715/507 |
| 2005/0198563 A1 * | 9/2005 | Kristjansson | 715/507 |
| 2005/0278295 A1 * | 12/2005 | Bernet et al. | 707/1 |

OTHER PUBLICATIONS

Braband et al.,"PowerForms: Declarative client-side form field validation", Dec. 2000, Springer, pp. 205-214.*

Girgensohn et al.,"Seamless Integration of Interactive Forms Into the Web", 1997, Elsevier, 12 pages.*

Thistlewaite et al.,"Active Forms", May 6-10, 1996, WWW, 5, 11 pages.*

Maret, P., et al., "Multimedia Information Interchange: Web Forms Meet Data Servers," Proceedings of the International Conference on Multimedia Computing and Systems, Los Alamitos, CA, USA, vol. 2, Jun. 7, 1999, pp. 499-505.

"Microsoft Access Relational Database Management System for Windows Users Guide," Microsoft Corporation, Dec. 20, 1993, first edition, second print, pp. 47-50, pp. 247-267 (in Japanese with attached English translation).

"Microsoft Excel Users Guide," Microsoft Corporation, Feb. 1, 1994, first edition, first print, pp. 116-117, pp. 223-234 (in Japanese with attached English translation).

U.S. Appl. No. 10/614,174, filed Jul. 8, 2003.

* cited by examiner

FIELD LIST

- FIELD 1
- FIELD 2
- FIELD 3
- FIELD 4
- FIELD 5
- .........

FIELD ATTRIBUTES

- FIELD ID
- FIELD NAME
- FIELD FORMAT
- DATA TYPE
- INPUT PICTURE

| KIND | EXAMPLE | SUPPLEMENT |
|---|---|---|
| TYPE SPECIFICATION CHARACTER | 9 (NUMERICAL VALUE), X (CHARACTER), Y (WESTERN YEAR), G (ERA-NAME KANJI), g (JAPANESE YEAR), M (MONTH), D (DATE), h (HOUR), m (MINUTE), s (SECOND), ......... etc. | |
| SKIP CHARACTER | ! | SHOULD NOT BE OVERLAPPED WITH TYPE SPECIFICATION CHARACTER |
| FIXED CHARACTER | /, YEAR, MONTH, DATE, : , ......... etc. | CHARACTER OTHER THAN TYPE SPECIFICATION CHARACTER AND SKIP CHARACTER |

FIG. 12

| PICTURE WORD | FIELD DATA WORD |
|---|---|
| YYYY | 2001 |
| MM | 12 |
| DD | 13 |

FIG. 19

| KIND | EXAMPLE | SUPPLEMENT |
|---|---|---|
| TYPE SPECIFICATION CHARACTER | 9 (NUMERICAL VALUE), X (CHARACTER), Y (WESTERN YEAR), G (ERA-NAME KANJI), g (JAPANESE YEAR), M (MONTH), D (DATE), h (HOUR), m (MINUTE), s (SECOND), ......... etc. | |
| SKIP CHARACTER | ! | SHOULD NOT BE OVERLAPPED WITH TYPE SPECIFICATION CHARACTER AND REPETITION CHARACTER |
| FIXED CHARACTER | /, YEAR, MONTH, DATE, : , ......... etc. | CHARACTER OTHER THAN TYPE SPECIFICATION CHARACTER, SKIP CHARACTER AND REPETITION CHARACTER |
| REPETITION CHARACTER | ((REPETITION NUMBER STARTS),)) (REPETITION NUMBER ENDS) | SHOULD NOT BE OVERLAPPED WITH TYPE SPECIFICATION CHARACTER AND SKIP CHARACTER. AT (n), PICTURE CHARACTER IMMEDIATELY BEFORE '(' IS REPEATED n TIMES |

F I G. 20

| PICTURE WORD | DATA LENGTH | VARIABLE-DATA-LENGTH FLAG | FIELD DATA WORD |
|---|---|---|---|
| Y(0) | 0 | ON | |
| YEAR | 1 | OFF | 2001 |
| M(2) | 2 | OFF | YEAR |
| MONTH | 1 | OFF | 12 |
| DD | 2 | OFF | MONTH |
| DATE | 1 | OFF | 13 |
| | | | DATE |

FORM PROCESSING APPARATUS, FORM PROCESSING METHOD, RECORDING MEDIUM AND PROGRAM

FIELD OF THE INVENTION

The present invention relates to a form processing program for overlaying data described in a field data source (hereinafter referred to as "field data") onto fields predetermined in a form (memory areas in the program for receiving the data in the field data source), a recording medium for storing the program, a form processing apparatus and a form processing method.

BACKGROUND OF THE INVENTION

A form processing program is a program for overlaying field data onto fields predetermined in a form, which enables field data in accordance with field attributes of each field to be overlaid.

Field attributes are information each field individually holds for filed data overlaying, including a data type such as character type, numerical type and date type. Traditionally, the format of field data effective for a data type defined as a filed attribute is specified in specifications of a form processing program. For example, a format "2001/12/03" is specified for field data for a date-type field.

A data source of field data is, however, usually not only utilized by a form processing program but also often read and written by other applications. Accordingly, the storage format of the data is not always that specified by the form processing program.

In prior-art methods, it is necessary to convert field data stored in a data source in accordance with formats specified by a form processing program (that is, to process the field data into formats suitable for the form processing program) before overlaying it onto fields.

Furthermore, when overlaying field data directly from a database onto fields, the field data must be stored in accordance with the formats specified by the form processing program. Thus, when using the same data table created for a database for other purposes, it is necessary to devise in designing the database or create a separate table.

SUMMARY OF THE INVENTION

The present invention is intended to solve the above problems, and the object thereof is to provide a form processing program enabling field data to be overlaid without being processed, in form processing for overlaying field data onto fields in a form, a recording medium for storing the program, a form processing apparatus and a form processing method.

To accomplish the above object, the form processing method according to the present invention is configured as follows. That is, the method is:

a form processing method for reading a field data source storing data to be overlaid onto fields defined in a form and overlaying the data of the field data source onto the fields in a form; the form processing method comprising the steps of:

setting a character string for each of the fields as field attribute information, the character string being composed of characters indicating a format of data to be overlaid; and overlaying the data of the field data source onto the fields by extracting the data based on the character string.

Other objects, features, effects and advantages of the present invention will be apparent from the following description, taken in conjunction with the accompanying drawings, in which like reference characters designate the same or similar parts throughout the figures thereof.

BRIEF DESCRIPTION OF THE DRAWINGS

FIG. 10 shows examples of kinds of picture characters in a first embodiment of the present invention;

FIG. 12 shows an example of a data table created for a field and field data in a first embodiment of the present invention;

FIG. 19 shows examples of kinds of picture characters in a second embodiment of the present invention; and FIG. 20 shows an example of a data table created for a field and field data in a second embodiment of the present invention.

DETAILED DESCRIPTION OF THE PREFERRED EMBODIMENTS

First Embodiment

Embodiments of the present invention are now described below with reference to the drawings. The terms used in the description below are defined as follows. A "form" means a file having a frame, fixed graphics, characters and the like and allowing field data to be overlaid onto fields defined therein. A "field data source" means a database file (or a database) in which data to be overlaid onto fields defined in a form is classified and stored according to data items. A "data item" means an element composing a set of field data.

Figure 1:
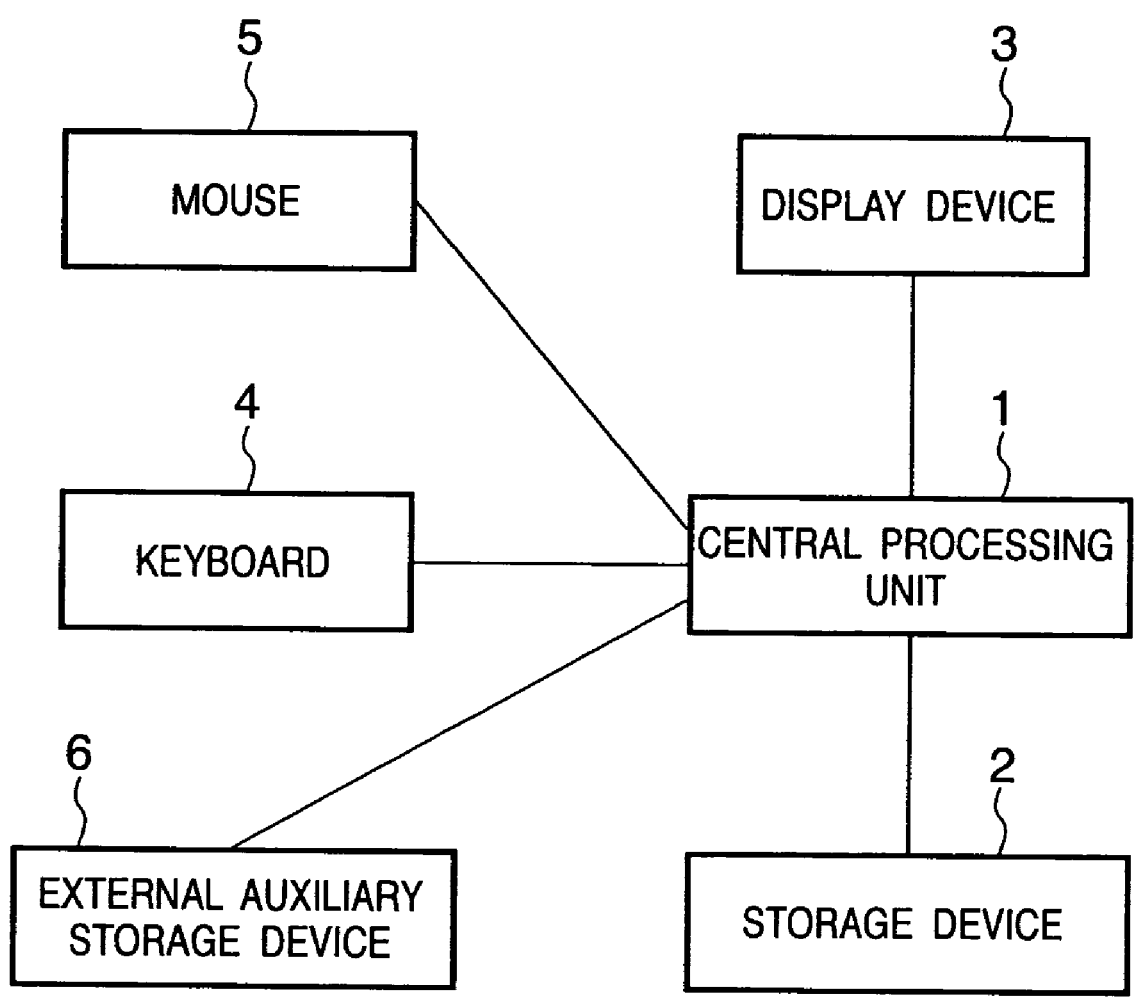
FIG. 1 is a block diagram showing a hardware configuration of a form processing apparatus for implementing each embodiment of the present invention.

FIG. 1 is a block diagram showing a system configuration of a form processing apparatus for implementing each embodiment of the present invention. FIGS. 2 to 6 are flowcharts showing a flow of data processing in the form processing apparatus shown in FIG. 1.

Figure 7:
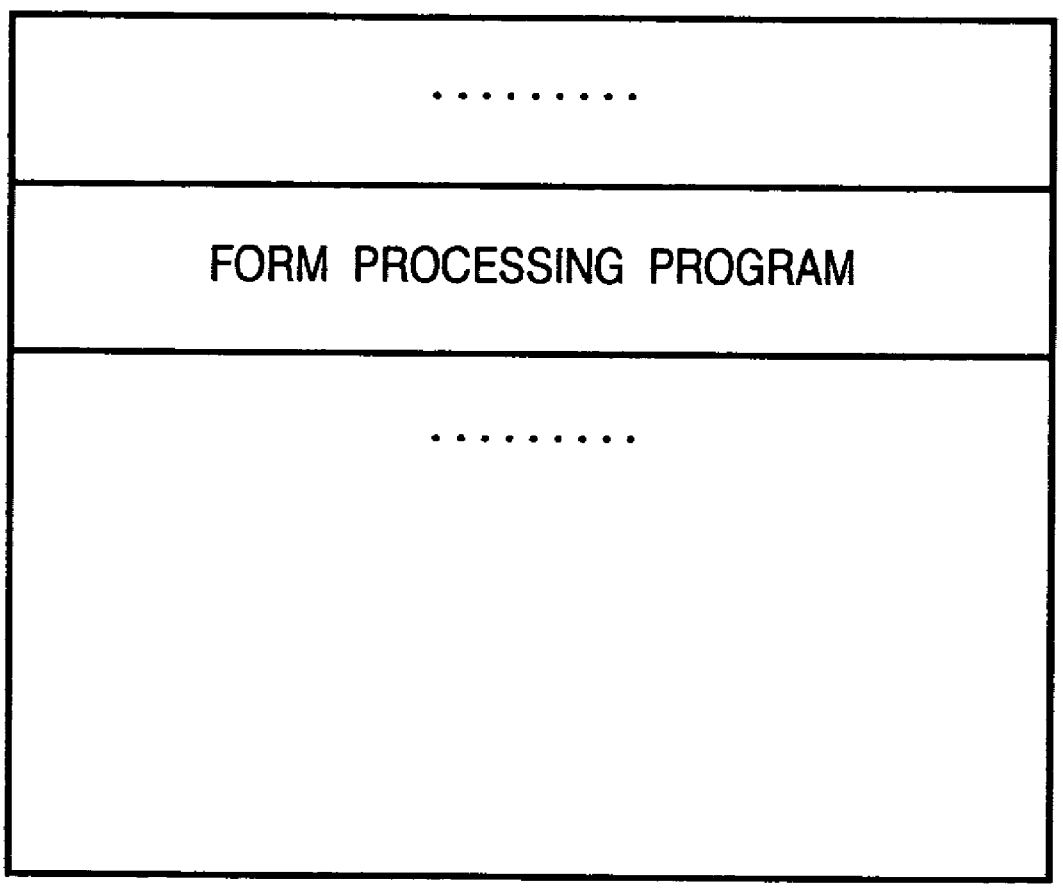
FIG. 7 shows a configuration of a form processing program in a recording medium composing a form processing apparatus for implementing each embodiment of the present invention.

In FIG. 1, reference numeral 1 denotes a central processing unit, 2 denotes a storage device such as RAM, 3 denotes a display device such as CRT, 4 denotes a keyboard, and 5 denotes a mouse, 6 denotes an external auxiliary storage. The external auxiliary storage device 6 suggests that a program and the like are provided from a medium to a form processing apparatus. The following can be used as the storage medium for storing a program and the like: ROM, floppy® disk, CD-ROM, hard disk, memory card, magneto-optical disk, etc. FIG. 7 shows a configuration of a form processing program stored in a storage medium.

Figure 8:
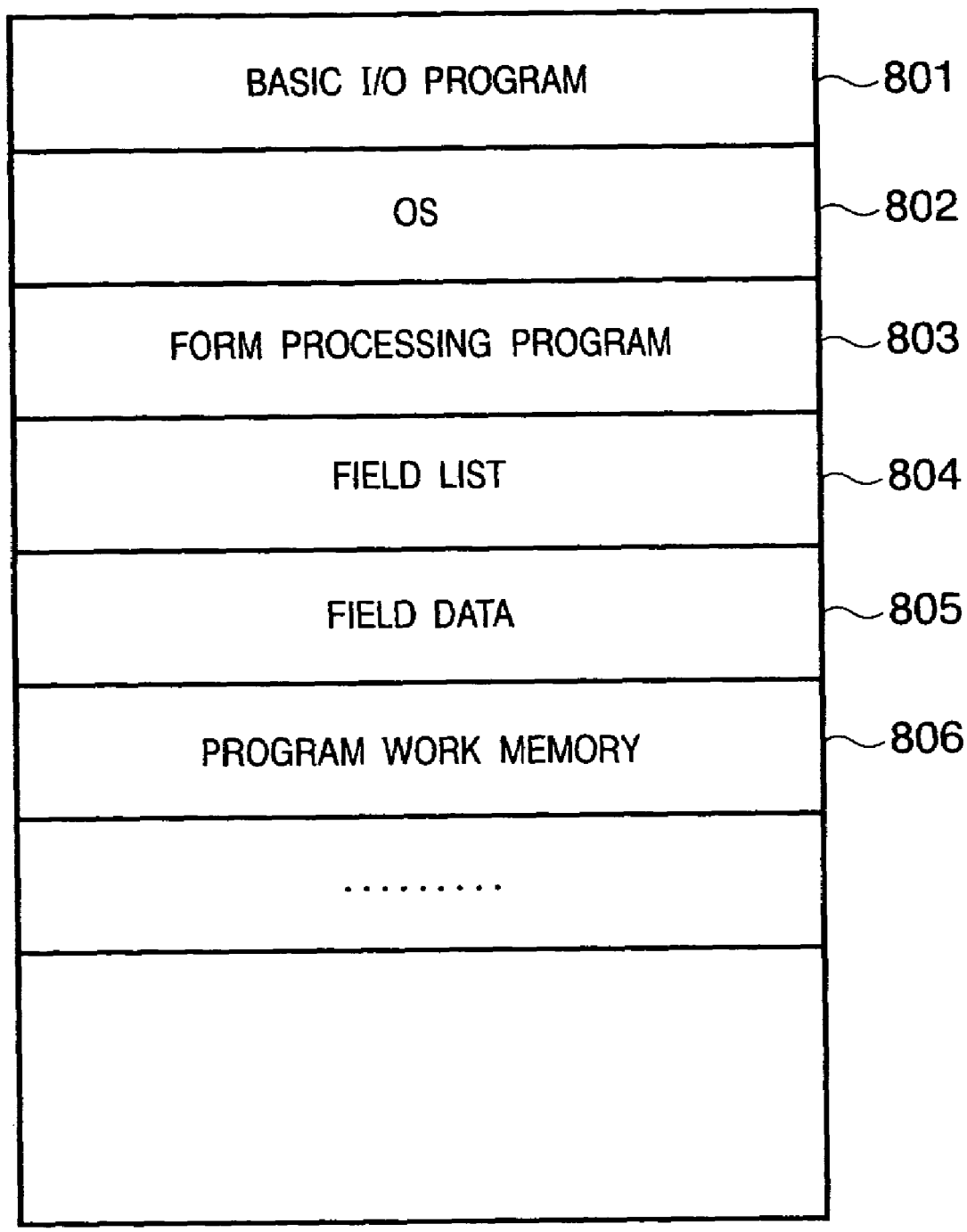
FIG. 8 shows a memory map in a condition that a form processing program is executable in a form processing apparatus for implementing each embodiment of the present invention.

FIG. 8 shows a memory map in a condition that a form processing program, a field list and field data are stored in the storage device 2 and the program is executable.

Figure 9:
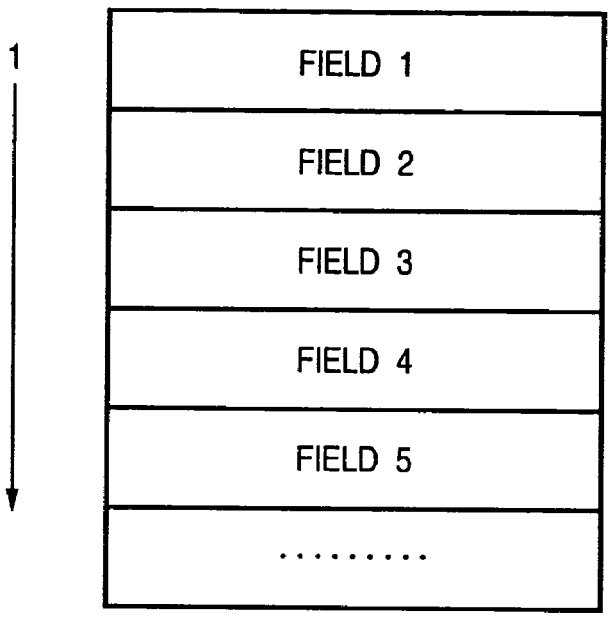
FIG. 9 shows an example of a field list and examples of field attributes in a form processing apparatus for implementing each embodiment of the present invention.

The field list is data in which field information is stored in the order of the fields (FIG. 9). Each of the fields has field attributes. The field attributes include a field ID, field name, field format, data type, input picture, etc.

The field ID is a unique number identifying a field in the program. The field name is a unique character string for a user to identify a field.

The field format takes a value of "fixed", "variable", "automatic", etc. A field with a fixed format (hereinafter referred to as a fixed field) receives data common to each print page; a field with a variable format (hereinafter referred to as a variable field) receives data which may vary according to each print page, and a field with an automatic format (hereinafter referred to as an automatic field) receives data automatically generated by the program, for example, time and data of starting the print, print pages, etc.

The data type indicates the kind of data to be received and takes a value of character, numerical value, date, time, bar code and the like.

The input picture is a character string indicating a format of field data to be received by the field, and the field interprets field data to be overlaid thereon according to the format. The input picture is composed of picture characters of three kinds, that is, type specification character, skip character and fixed character.

FIG. 10 shows examples of the three kinds of picture characters. The type specification character specifies how corresponding characters in the field data should be interpreted. For example, "9" is interpreted as a numerical value, "X" as a character, and "G" as an era-name kanji. Field data which cannot be interpreted with a type specification character is regarded as not in accordance with the input picture and an error occurs. For example, if "character" field data is overlaid for "9 (numerical value)" or "year" field data for "G (era-name kanji)", then an error occurs.

The type specification characters may be restricted in usable kind, combination and order in some cases. For example, type specification characters which can be used for the date data type are "Y" (western year), "M" (month), "D" (date), "G (double-byte character)" (era-name kanji) and "g" (Japanese year). They may be restricted, for example, in that "Y", "G" and "g" must not be combined but "G" and "g" must be combined, and that the same type specification characters must not be discontinuous. Such restrictions are assumed to be set when the input picture is set.

Figure 11:
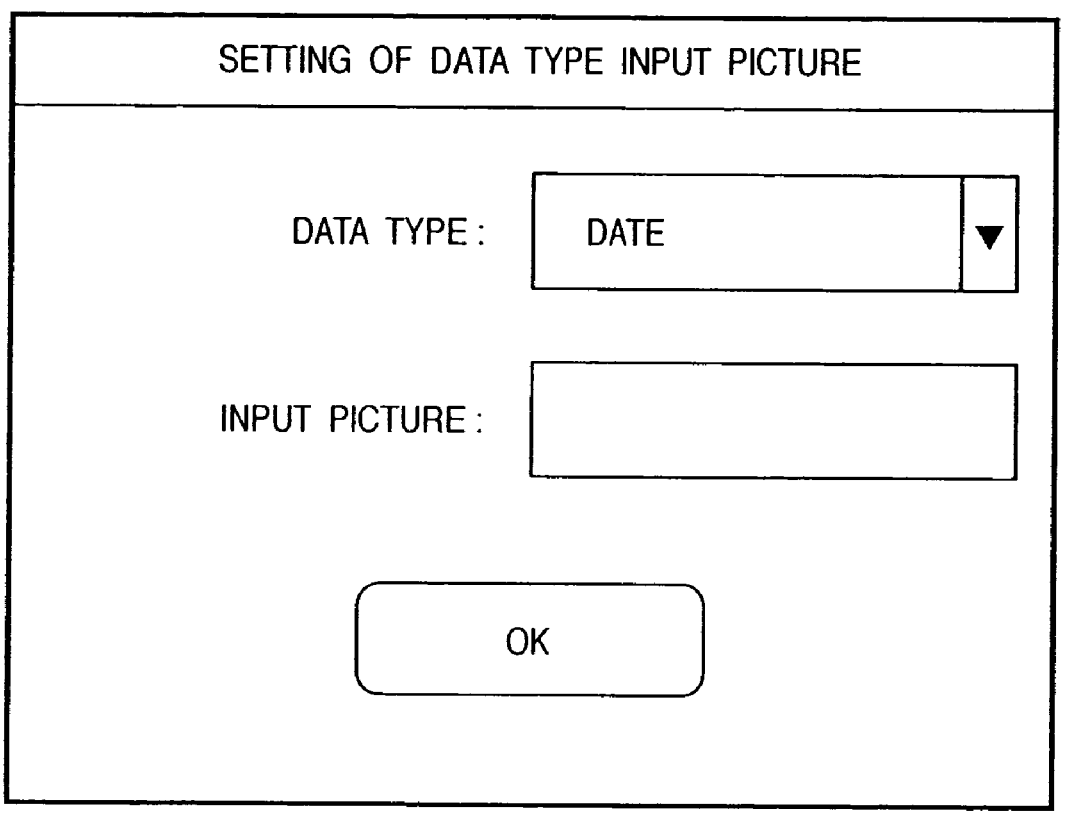
FIG. 11 shows an example of a screen for setting a data type and an input picture of a field in a form processing apparatus for implementing each embodiment of the present invention.

FIG. 11 is an example of a screen for setting a data type and an input picture of a field. On this screen, a user selects a data type from the list, inputs an input picture, and clicks the OK button. Then, the combination of the data type and the input picture, the combination of the type specification characters, and the like are checked. If there is any incorrectness, an error is displayed and the setting cannot be established.

The skip character is for specifying any corresponding character in field data to be skipped. It must be a character which is not used as a type specification character. For a picture "YYYY!MM!DD", for example, both "2001/12/13" and "2001%12%13" are interpreted as Year 2001, Month 12, Date 13.

The fixed character is for specifying a particular corresponding character in field data to be skipped. It must be a character other than a type specification character and a skip character. If the corresponding character in the field data is not the particular character, the field data is regarded as not in accordance with the input picture and an error occurs.

For example, field data of "Year 2001, Month 12, Date 13" can be overlaid onto a date data type field for which "Year YYYY, Month MM, Date DD" is set as the input picture, but field data "Year 2001, Month 12, Date 13" causes an error.

Figure 2:
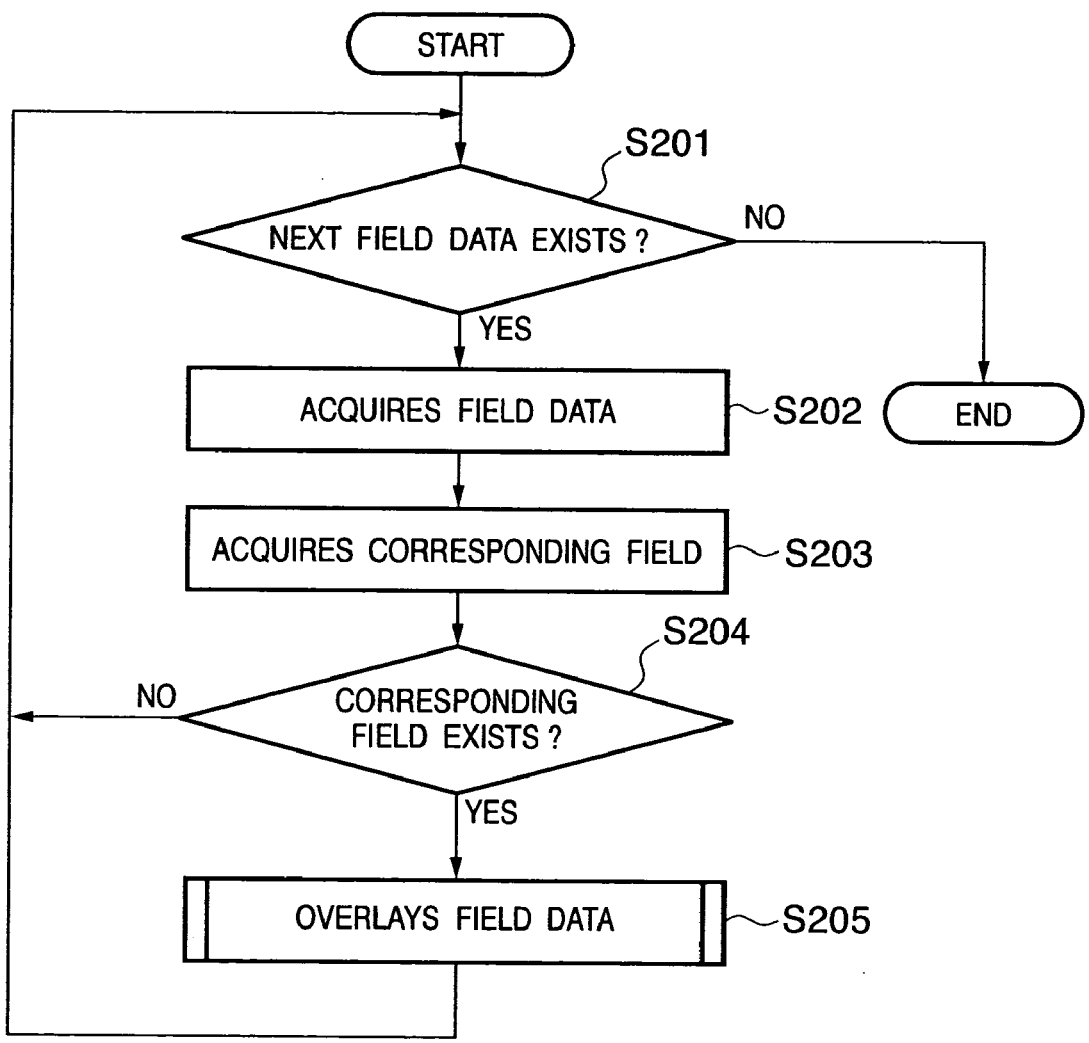
FIG. 2 is a flowchart showing a flow of data processing common to each embodiment of the present invention.

The present invention is an example of sequentially overlaying a plurality of field data included in a data source onto corresponding fields, and the form processing program performs processing in a procedure shown in FIG. 2.

First, it is determined whether the first field data exists in a data source (step S201). If it exists, the field data is acquired (step S202) and a corresponding field is acquired from a field list (step S203). It is then determined whether the field has been acquired (step S204). If it has been acquired, then the field data acquired at step S202 is overlaid onto the field acquired at step 203 (step S205). When the overlaying of the field data has been completed, the process returns to step S201. If it is determined that the field has not been acquired at step S204, the process also returns to S201. The steps S201 to S205 are then repeated until there is no more field data to be overlaid.

Figure 3:
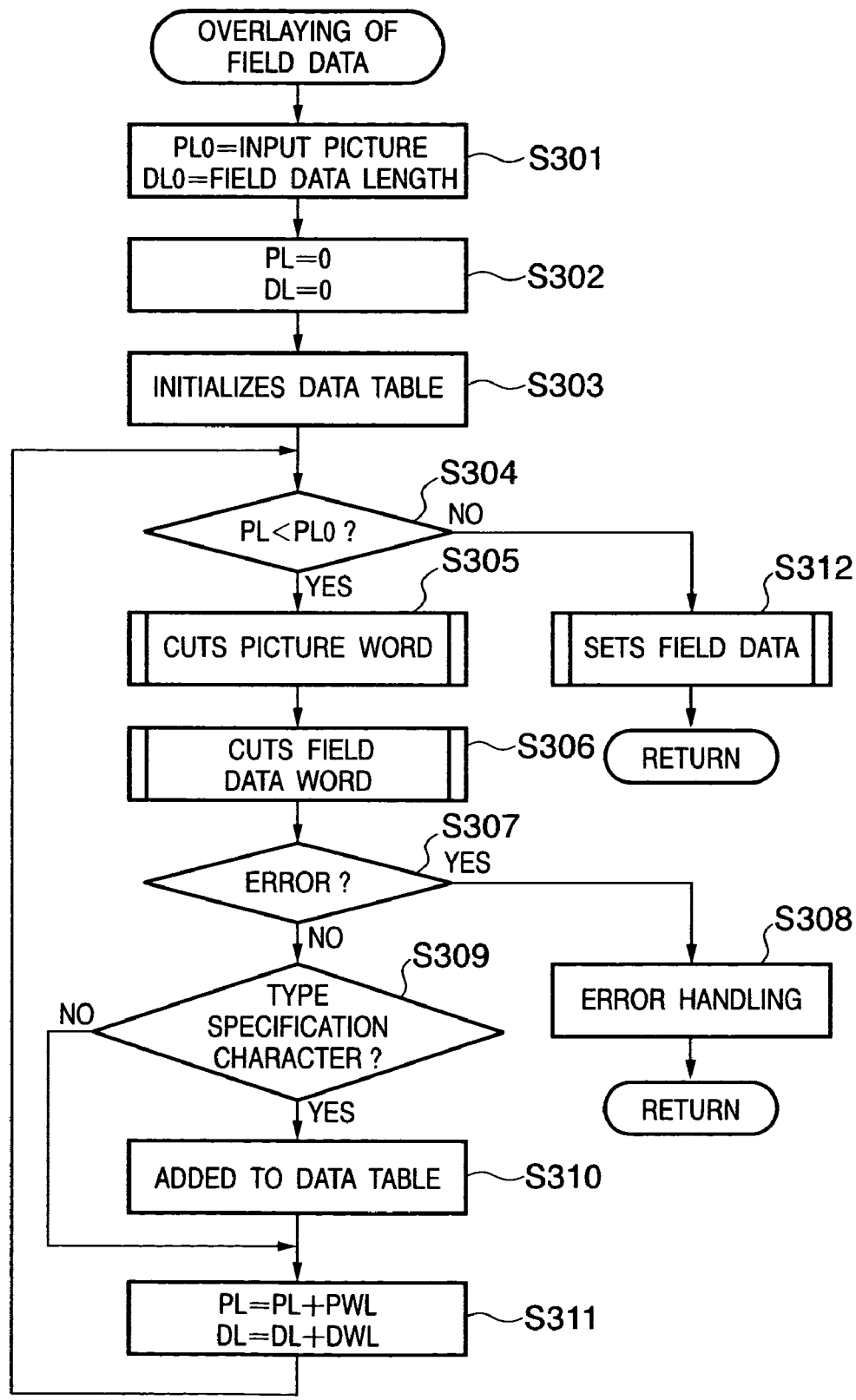
FIG. 3 is a flowchart showing a flow of data processing in a first embodiment of the present invention.

FIG. 3 shows a flowchart showing the flow of the field data overlaying processing performed at step S205. In the field data overlaying processing, a picture word (described in detail later) is cut from an input picture of a field, and a field data word (described in detail later) for the cut picture word is cut. It is then determined whether the picture word is composed of type specification characters. If it is composed of type specification characters, the picture word and the field data word are added to a data table as a pair. Based on the created data table, field data is set for fields.

First, there are set a variable PL0 indicating the number of characters of the character string of the input picture for the field acquired at step S203 and a variable DL0 indicating the number of characters of the field data acquired at step S202 (step S301).

Furthermore, a variable PL indicating the number of processed picture characters and a variable DL indicating the number of processed field data characters are initialized to 0 (step S302), and the data table is initialized to empty (step S303). The data table is a table in a program work memory 806 into which pairs of a picture words and field data words described below are to be stored.

PL and PL0 are then compared (step S304). If PL is smaller, a picture word is cut from the unprocessed PL-th (0:

origin) and subsequent picture characters of the input picture, and the character string is set for a variable PWS, and the number of the characters is set for a variable PWL (step S305). A picture word is an input picture to be continuously processed. The picture word is a string composed of continuous characters of the same one kind among the three kinds, that is, type specification character, skip character and fixed character. In the case of "Year YYYY, Month MM, Date DD", for example, each of "Year", "YYYY", "Month", "MM", "Date", and "DD" is a picture word.

Then, a field data word is cut from the unprocessed DL-th (0: origin) and subsequent characters of the field data, and the character string is set for a variable DWS, and the number of the characters is set for a variable DWL (step S306). A field data word is field data corresponding to a cut picture word.

For example, in the case of field data "Year 2001, Month 12, Date 13" for an input picture "Year YYYY, Month MM, Date DD", each of "Year", "2001", "Month", "12", "Date", and "13" is a field data word.

It is determined whether an error has occurred at step S306 (step S307). If it has occurred, error handling is performed (step S308), and the process ends.

If no error has occurred, then it is determined whether the picture word PWS is a character string composed of type specification characters (step S309). If so, the pair of the cut picture word PWS and the field data word DWS is added to the data table (step S310). Then, PWL is added to PL, and DWL to DL (step S311). The steps S304 to S310 are subsequently repeated until all the input picture has been processed.

When all the input picture has been processed without an error, that is, when PL=PL0 is determined at step S304, there should be completed pairs of picture words of all the type specification characters composing the input picture and the corresponding field data words in the table data.

FIG. 12 shows an example of a data table when field data for an input picture "Year YYYY, Month MM, Date DD" is "Year 2001, Month 12, Date 13". When field data is too short for the input picture, no error occurs but a field data word may be too short or a null character. The field data is set in a field based on the picture words and the field data words stored in the data table (step S312), and the process ends.

Figure 4:
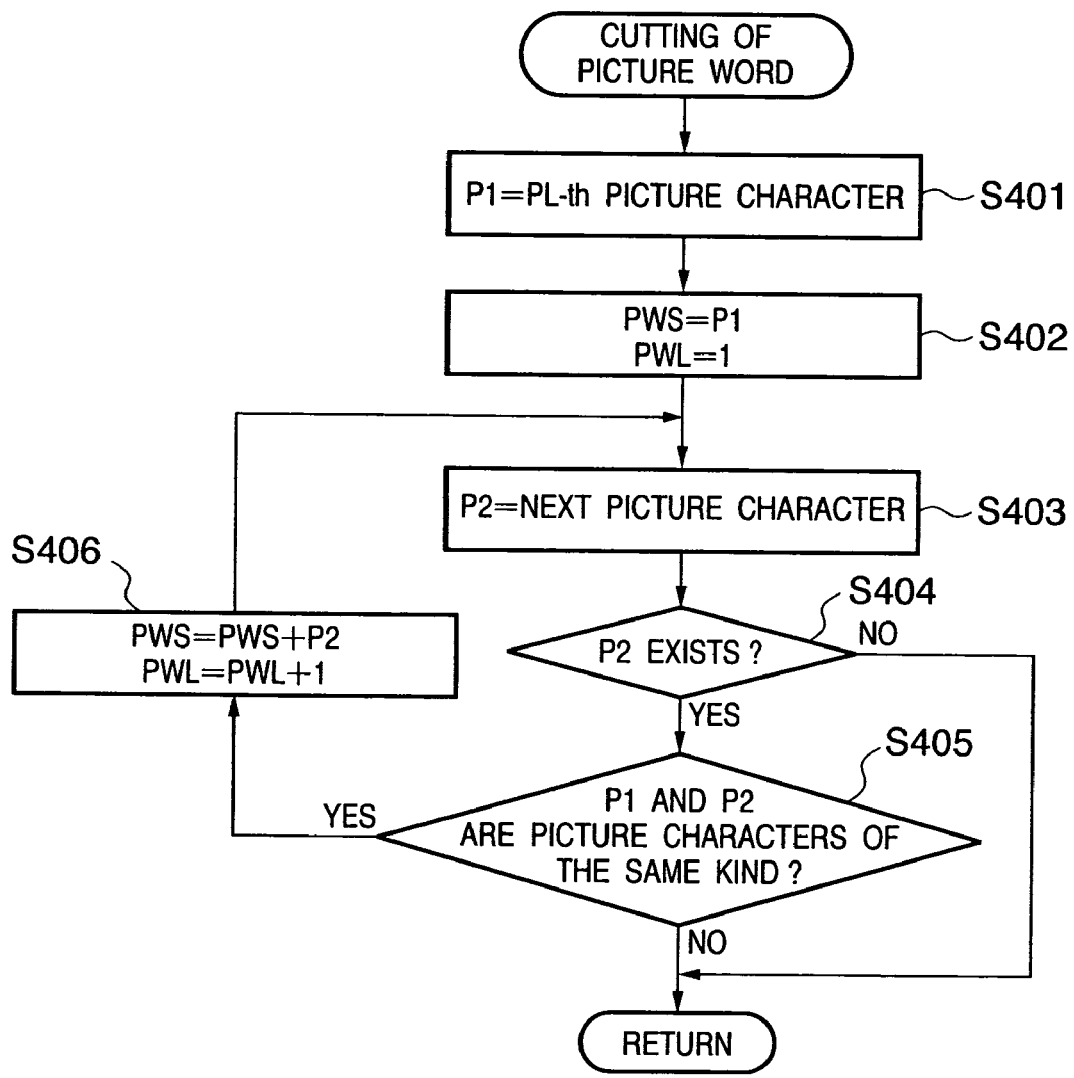
FIG. 4 is a flowchart showing a flow of data processing in a first embodiment of the present invention.

FIG. 4 shows a flowchart showing the flow of the picture word cutting processing performed at step S305. In the picture word cutting processing, the first character of the unprocessed portion of the input picture is acquired; picture characters are sequentially searched until a picture character of a kind different from that of the first picture character appears or until the last picture character is reached; and then a portion of the input picture composed of picture characters of the same kind is cut as a picture word.

First, the PL-th (0: origin) character of the input picture is acquired and set for a variable P1 (step S401). Then, PWS indicating a character string of a picture word and PWL indicating the number of characters of the picture word are initialized (step S402). PWS becomes P1, and PWL becomes 1.

Then, the next picture character is acquired and set for a variable P2 (step S403), and it is determined whether the P2 has been acquired (step S404). If it has been acquired, then it is determined whether P1 and P2 are picture characters of the same kind (step S405). If they are of the same kind, the character P2 is added to the character string PWS, and 1 to PWL (step S406), and the process returns to step S403. The steps S403 to S406 are repeated until a picture character of a different kind appears or until all the input picture has been processed, and the process ends.

Figure 5:
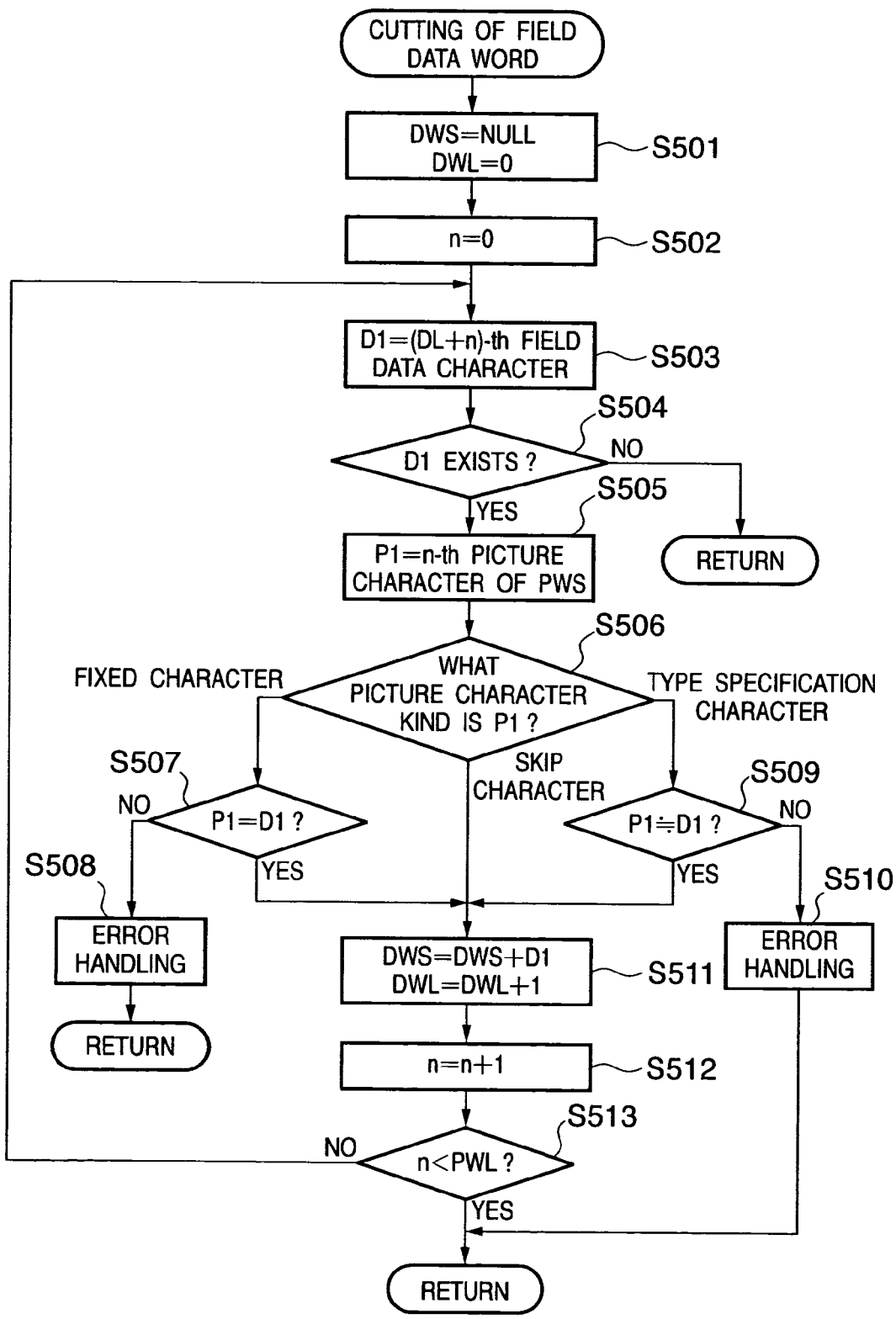
FIG. 5 is a flowchart showing a flow of data processing in a first embodiment of the present invention.

FIG. 5 shows a flowchart showing the flow of the field data word cutting processing performed at step S305. In the field data word cutting processing, unprocessed data in the field data is acquired. Then, picture characters of the cut picture word which correspond to field data are acquired, and the kind of the acquired picture characters is determined. If the acquired picture character is a fixed character, then it is determined whether the character is identical to the acquired field data. If the acquired picture character is a type specification character, then it is determined whether the character is a type specification character capable of receiving the acquired field data. The process loops as many times as the number of the characters composing the cut picture word or until the end of the filed data is reached.

First, DWS indicating a character string of a field data word and DWL indicating the number of characters of the field data word are initialized (step S501). DWS becomes NULL (a null character), and DWL becomes 0. Furthermore, a loop counter variable n is initialized to 0 (step S502).

Next, the unprocessed (DL+n)-th (0: origin) character in the field data is acquired and set for a variable D1 (step S503). It is then determined whether D1 has been acquired (step S504). If it has not been acquired, the process ends. If it has been acquired, the n-th (0: origin) picture character of the picture word PWS acquired at step S305 is set for the variable P1 (step S505). The picture character kind of P1 is determined (step S506), and the process is switched.

If P1 is a fixed character, it is determined whether P1 is identical to D1 (step S507). If it is not, error handling is performed (step S508), and the process ends. If P1 is a type specification character, then it is determined whether it is a type specification character capable of receiving D1 (step S509). If it is not, error handling is performed (step S510), and the process ends.

If P1 is determined to be a skip character at step S506, or it is determined to be the same character as D1 at step S507, or it is determined to be a type specification character capable of receiving D1 at S509, then D1 is added to DWS, 1 to DWL (step S511) and 1 to n (step S512). It is then determined whether n is smaller than the number of characters PWL of the picture word (step S513). If it is smaller, the process returns to step S503. The steps S503 to S513 are repeated until n becomes identical to PWL, and the process ends.

Figure 6:
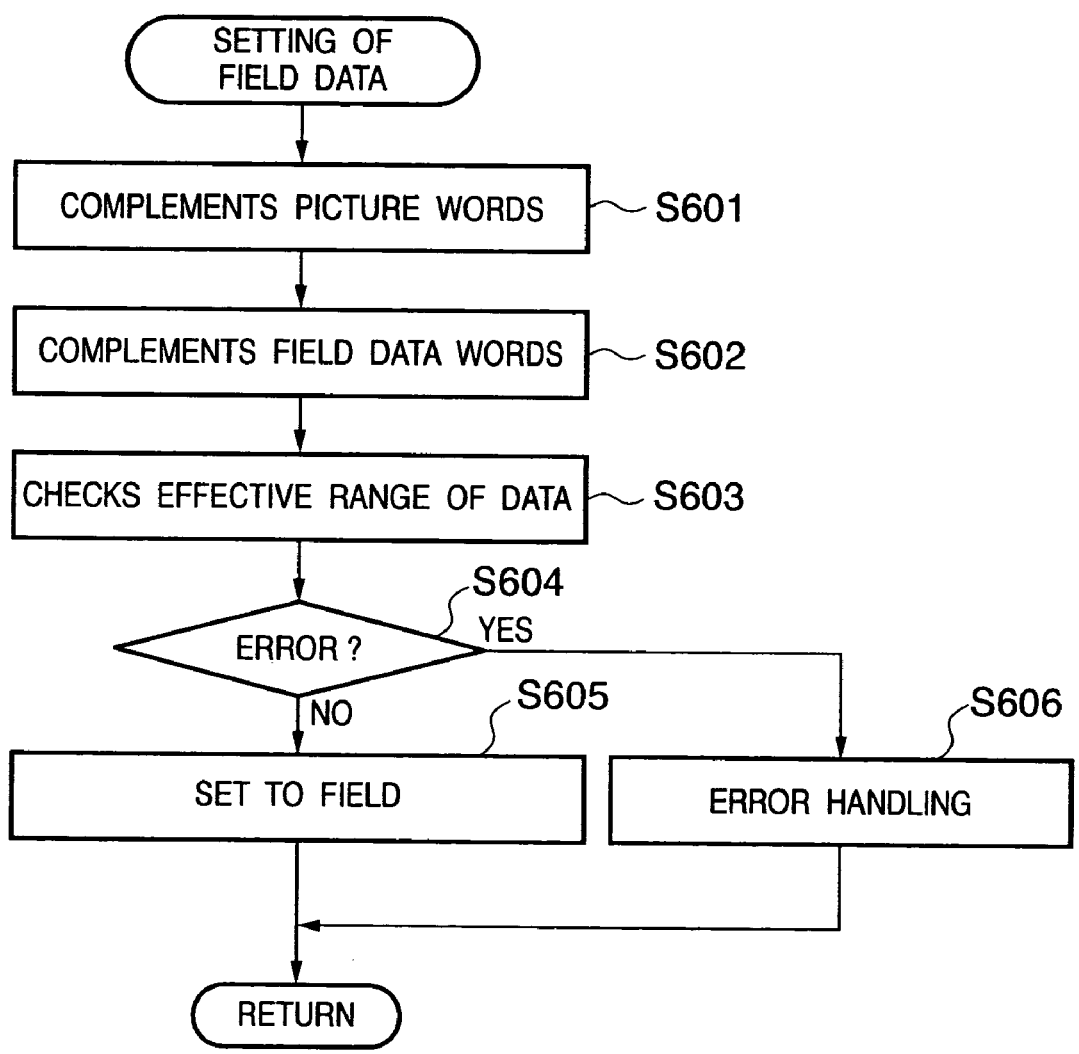
FIG. 6 is a flowchart showing a flow of data processing in a first embodiment of the present invention.

FIG. 6 shows a flowchart of the flow of the field data setting processing performed at step S312. In the field data setting processing, pairs of picture words insufficient for the data type of the field and empty field data words are added to the data table, and the missing field data words in the data table are complemented. The effective range of the field data words in the data table is checked, and if there is no error, the field data is set in the field.

First, pairs of picture words insufficient for the data type of the field and empty field data words are added to the data table (step S601). For example, when an input picture for a date-data-type field, which can store a western year, month and date, is "MMDD", a pair of a picture word "YYYY" and an empty field data word is added to the data table. Then, empty field data words and too short field data words are complemented (step S602). For example, if the field data word corresponding to the picture word "YYYY" is empty, a western year, for example, may be set for it.

Next, it is checked if data in the data table is within the range effective for the data type of the field (step S603). For example, for a date-type field, it is checked if the field data word corresponding to the picture word "MM" is any one of "1" to "12". It is determined whether the result of the check is an error (step S604). If the result of the effective range check of the data is not an error, the field data composed of a combination of the field data words in the data table is set in the field (step S605). For example, in the case of a date-data-type field storing the number of days elapsed since Jan. 1, 1900, the number of days from Year 1900, Month 01, Date 01 to Year 2001, Month 12, Date 13 is set in the field from a data table as shown in FIG. 12. If an error occurs at step S604, error handling is performed (step S606), and the process ends.

As apparent from the above description, when overlaying field data, field data stored in a data source can be overlaid onto fields without processing the field data by providing an input picture as a field attribute of each field and allowing the input picture to be set by a user depending on field data.

Furthermore, even when overlaying data directly from a database onto a form processing program, the data can be stored in a format independent from the form processing program, thereby allowing the same table in the database to be easily used for other applications.

Second Embodiment

In the first embodiment described above, an input picture is provided as a field attribute of each field to solve the problems to be solved by the invention. Even when using this method, if the number of characters of the field data set as a field attribute is large, the number of characters of the input picture to be described is also large, thereby presenting a problem that input on the input picture setting screen (setting of field attributes) is troublesome, and the incorrect number of characters may be input, for example.

Furthermore, even using the above method, if the number of characters of field data is variable, the form processing program for overlaying field data is required to overlay field data stored in a data source after adding a space at the end of field data in the case of a character-type field, and at the beginning in the case of a numerical-value-type field according to the number of an input picture (that is, after processing the field data).

Thus, in consideration of the above problem, another embodiment is now described which allows setting of field attributes to be done more easily.

FIG. 19 shows examples of four kinds of picture characters according to the present embodiment. In this figure, the type specification character, the skip character and the fixed character have already been described in detail in the above first embodiment, and description thereof is omitted. The repetition character, by which this embodiment is characterized, is now described in detail here. The repetition character is a repetition notation in the form of "(n)" (n: 0 or an integer above 0), which specifies the picture character immediately before "( )" to be repeated n times.

For example, "9(10)" equals to "9999999999". The repetition notation is effective to any picture character of the type specification character, the skip character and the fixed character but must not be placed at the beginning of an input picture. The repetition number "0" has a special meaning that the number of characters is undefined, and this is usually called a variable repetition notation.

For example, field data to be overlaid for an input picture "9(4)" is limited to a four-digit numerical value, while field data to be overlaid for an input picture "9(0)" can be a numerical value of any number of digits only if it is within the range that the form processing program can handle. The variable repetition notation can be used only once in an input picture for a field, because the number of characters of field data to be overlaid onto each picture character could not be identified if the variable repetition notation were used multiple times.

For example, the input picture "Year Y(0), Month M(2), Date D(2)" is valid, while the input picture "Year Y(0), Month M(0), Date D(2)" is invalid. The repetition notation is also checked on the input picture input screen. If the repetition notation is invalid, an error is displayed and the input picture cannot be set.

The flow of the processing by the form processing program according to the present embodiment is now described. The general flow (FIG. 2) for sequentially overlaying a plurality of field data onto corresponding fields is similar to that of the first embodiment described above, and therefore the field data overlaying processing and subsequent processings are described here.

Figure 13:
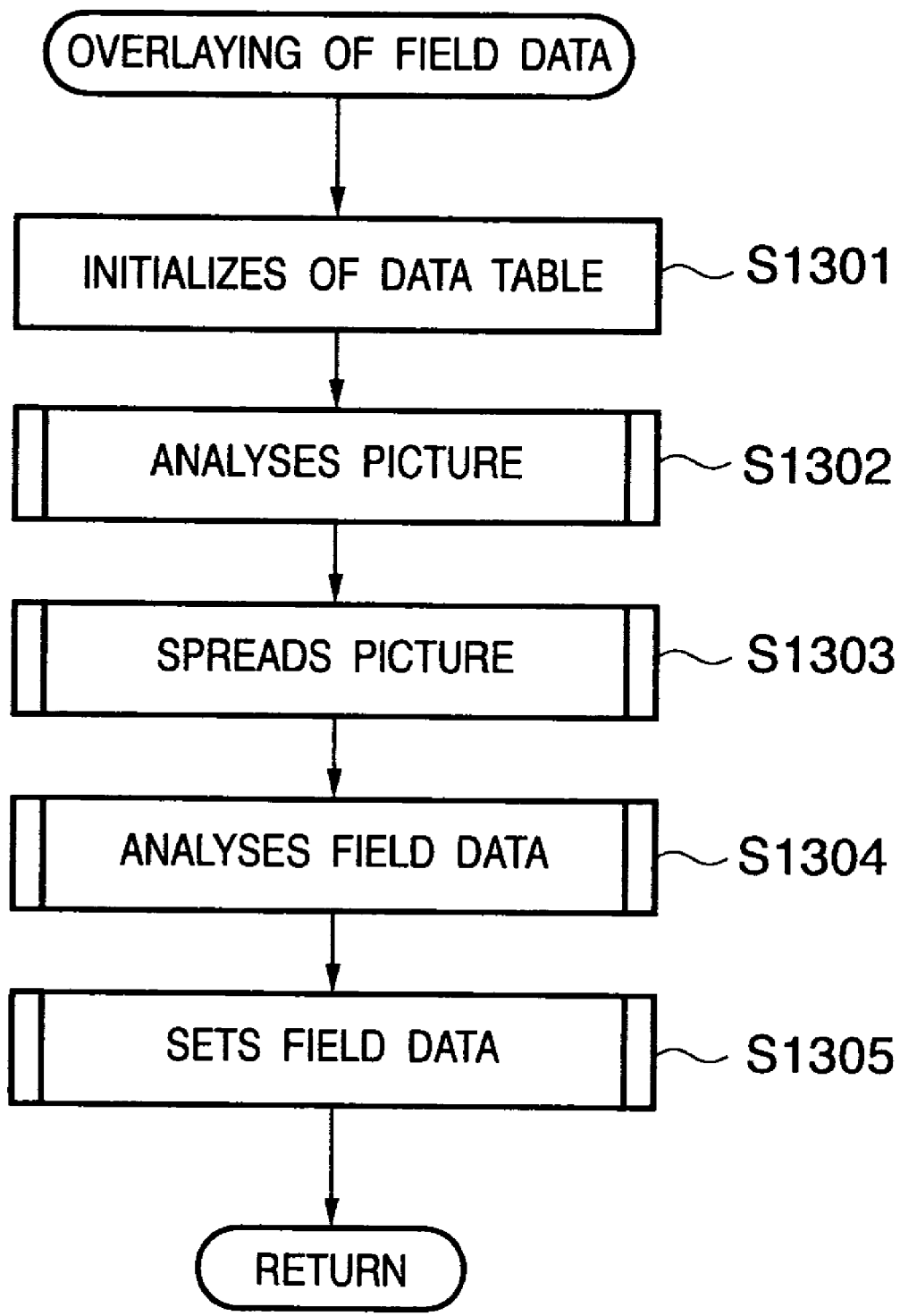
FIG. 13 is a flowchart showing a flow of data processing in a second embodiment of the present invention.

FIG. 13 shows a flowchart showing the flow of the field data overlaying processing performed at step S205. In the field data overlaying processing, the input picture for a field is analyzed; a data table is created by cutting picture words (a portion of an input picture to be continuously processed is referred to as a "picture word", the same hereinafter); a repetition notation in the picture word is spread into continuous picture characters, if any; field data is analyzed and stored as field data words (field data corresponding to a cut picture word is referred to as a "field data word", the same hereinafter) in the data table; and the field data is set in a field based on the created data table.

First, the data table is initialized to empty (step S1301). The data table is a table stored in a program work memory 806, for storing sets of picture words, data lengths, variable-data-length flags, and field data words.

Next, an input picture is analyzed and picture words are cut to create a data table (step S1302). Furthermore, if there is a repetition notation in the picture words, it is spread into continuous picture characters without using a repetition notation (step S1303). The field data is analyzed and stored as field data words in the data table (step S1304).

FIG. 20 is an example of a data table in the case that field data for an input picture "Year Y(0), Month M(2), Date DD" is "Year 2001, Month 12, Date 13". Finally, the field data is set in the field based on the picture words and the field data words stored in the data table (step S1305), and the process ends.

Figure 14:
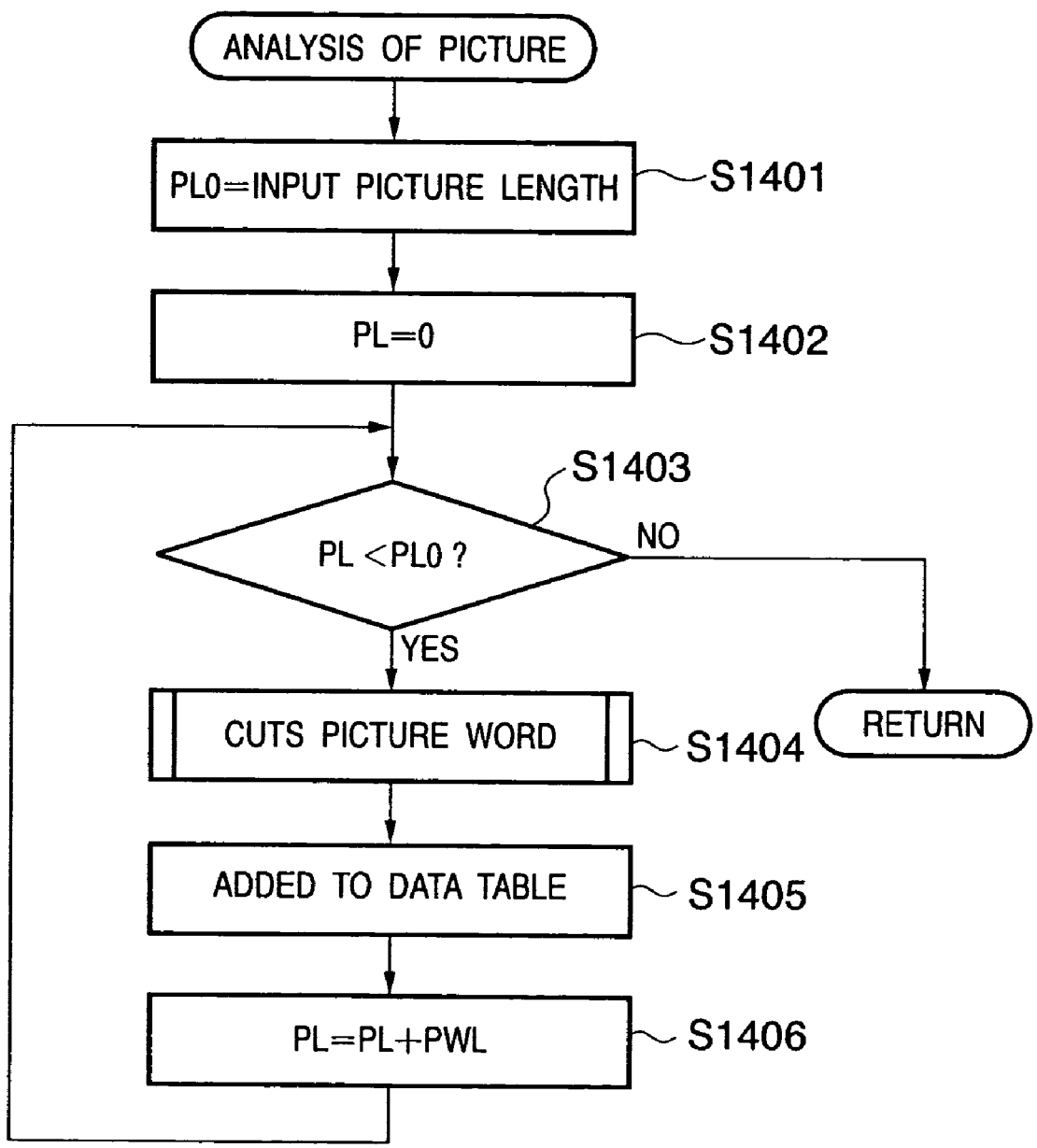
FIG. 14 is a flowchart showing a flow of data processing in a second embodiment of the present invention.

FIG. 14 shows a flowchart showing the flow of the picture analyzing processing performed at step S1302. In the picture analyzing processing, a picture word is cut from the unprocessed character string of the input picture, and a set of the picture word, the number of characters of the field data word, variable-data-length flag and an empty field data word is added to the data table.

First, a variable PL0, which indicates the number of characters of the character string of the input picture for the field acquired at step S203, is set (step S1401), and PL which indicates the number of processed input picture characters is initialized to 0 (step S1402).

PL and PL0 are then compared (step S1403). If PL is smaller, a picture word is cut from the unprocessed PL-th (0: origin) and subsequent picture characters of the input picture, and the character string is set for a variable PWS, and the number of the characters is set for a variable PWL (step S1404).

A picture word is a portion of an input picture to be continuously processed. The picture word is a string composed of continuous characters of the same one kind among the three kinds, that is, type specification character, skip character and fixed character. Characters covered by a repetition notation are regarded as the same kind as the picture character specified by the repetition notation.

In the case of "Year Y(0), Month M(2), Date DD", for example, each of "Year", "Y(0)", "Month", "M(2)", "Date" and "DD" is a picture word. At step S1404, the number of characters of field data to be received by the picture word (field data word) is set for a variable DWL, and a variable-data-length flag is set for a variable DWF.

Then, a set of PWS, DWL, DWF and an empty field data word is added to the data table (step S1405). Then, PWL is added to PL (step S1406), and the steps S1403 to S1406 are subsequently repeated until all the input picture has been processed, and the process ends. When all the input picture has been processed, that is, when PL=PL0 is determined at step S1403, there should be completed a table of sets of all the picture words composing the input picture, corresponding field data word lengths, variable-data-length flags and empty field data words.

Figure 15:
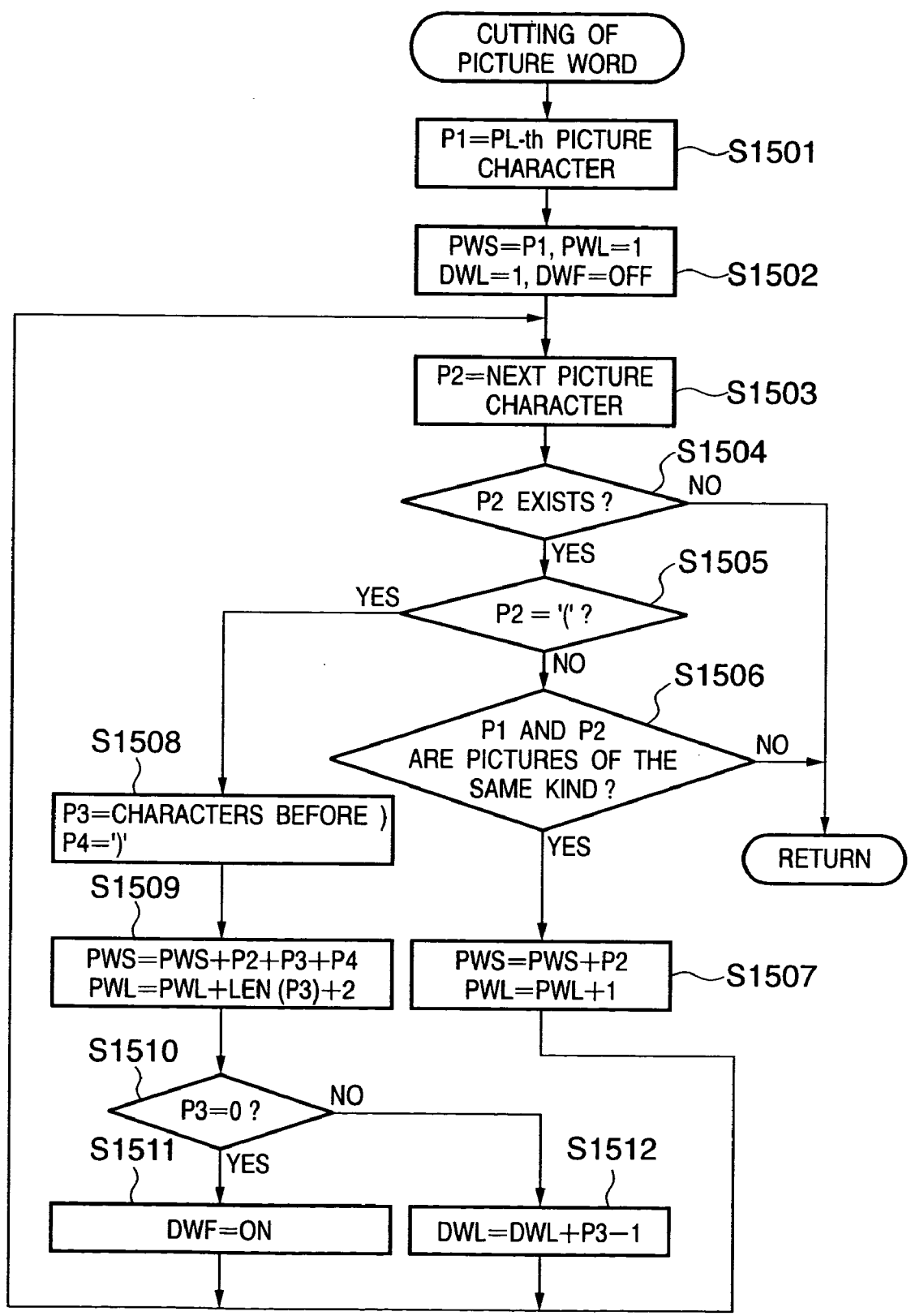
FIG. 15 is a flowchart showing a flow of data processing in a second embodiment of the present invention.

FIG. 15 shows a flowchart of the flow of the picture word cutting processing performed at step S1404. In the picture word cutting processing, the first character in the unprocessed portion of the picture is acquired; picture characters are sequentially searched until a picture character different from the first picture character appears or until the last picture character is reached; and then, the portion composed of picture characters of the same kind and a repetition notation of the picture character is cut as a picture word.

First, the PL-th (0: origin) of the input picture is acquired and set for a variable P1 (step S1501). Furthermore, PWS indicating a string character of a picture word, PWL indicating the number of characters of the picture word, DWL indicating the number of characters of field data to be received by the picture word (field data word), and the variable DWF of a variable-data-length flag indicating that the number of characters of the field data is undefined, that is, indicating whether a variable repetition notation is used in the picture word are initialized (step S1502). PWS becomes P1; PWL becomes 1; DWL becomes 1; and DWF becomes OFF.

The next picture character is then acquired and set for a variable P2 (step S1503), and it is determined whether the P2 has been acquired (step S1504). If it has been acquired, then it is determined whether P2 is a repetition number starting character "(" (step S1505). If it is not "(", then it is determined whether P1 and P2 are picture characters of the same kind (step S1506) (step S1405). If they are not of the same kind, the process ends. Otherwise, the character P2 is added to the character string PWS, and 1 to PWL (step S1507), and the process returns to step S1503.

If P2 is "(" at step S1505, the character string before a repetition number ending character ")" is set for a variable P3, and the ")" is set for a variable P4 (step S1508). The character string from the character P2 to the character P4 is added to the character string PWS, and the number of characters of P3 (LEN (P3)) and the repetition character 2 to PWL (step S1509).

It is then determined whether P3 (necessarily 0 or an integer above 0) is "0" (step S1510). If it is "0", DWF is ON (step S1511). Otherwise, the number of P3 minus 1 is added to DWL (step S1512), and the process returns to step S1503. The steps S1503 to S1512 are repeated until a picture character of a different kind appears or until all the input picture has been processed; the process ends; and the character string PWS is cut as a picture word (the number of characters of the cut picture word should be in PWL, and the number of characters of field data to be received by the cut picture word in DWL at this point.)

Figure 16:
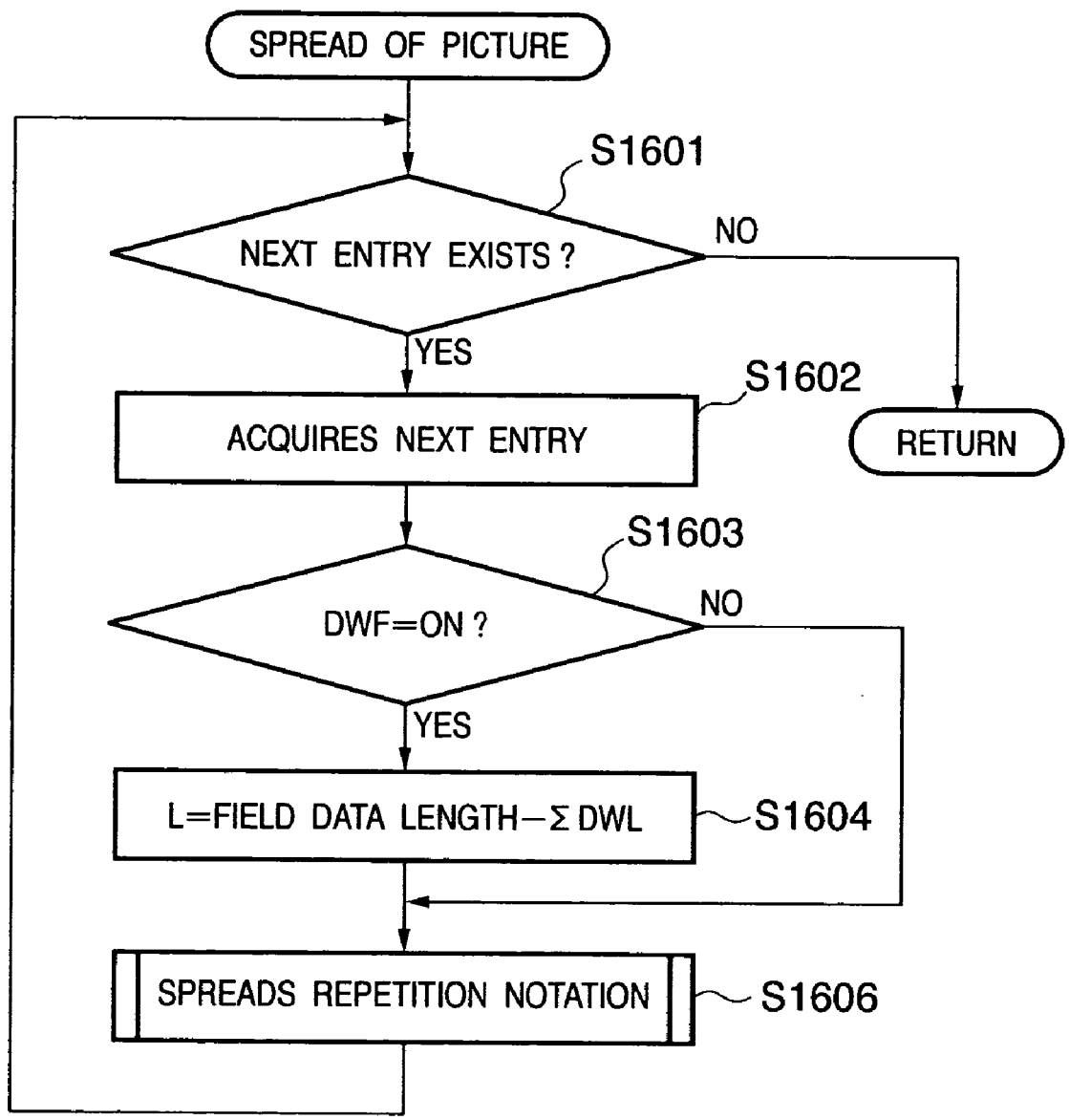
FIG. 16 is a flowchart showing a flow of data processing in a second embodiment of the present invention.

FIG. 16 shows a flowchart showing the flow of the picture spreading processing performed at step S1606. In the picture spreading processing, the number of characters of the field data minus the sum of lengths of the field data words of all the entries in the data table is acquired as the number of characters of variable-length data. Then, the number of characters of the variable-length data is added to the number of characters of the filed data words of the entries for which the variable-data-length flag is OFF, and the description of a repetition notation is spread into continuous picture characters.

First, it is determined whether the first entry exists in the data table (step S1601). If the entry exists, it is acquired (step S1602).

It is then determined whether DWF of the entry is ON (step S1603). If it is ON, the number of characters of the field data acquired at step S202 minus the sum of DWLs of all the entries in the data table is set for a variable L which indicates the number of characters of the variable-length data (step S1604).

The L indicates the number of characters of the field data to be overlaid onto a variable repetition notation included in the picture word PWS, and DWL is the number of the characters of a field data word to be received, including the variable repetition notation. If OFF is determined at step S1603, the step S1604 is skipped. The description of the repetition notation is spread into continuous picture characters (step S1606), and the process returns to step S1601. The steps S1601 to S1606 are repeated for all the entries in the data table, and the process ends.

Figure 17:
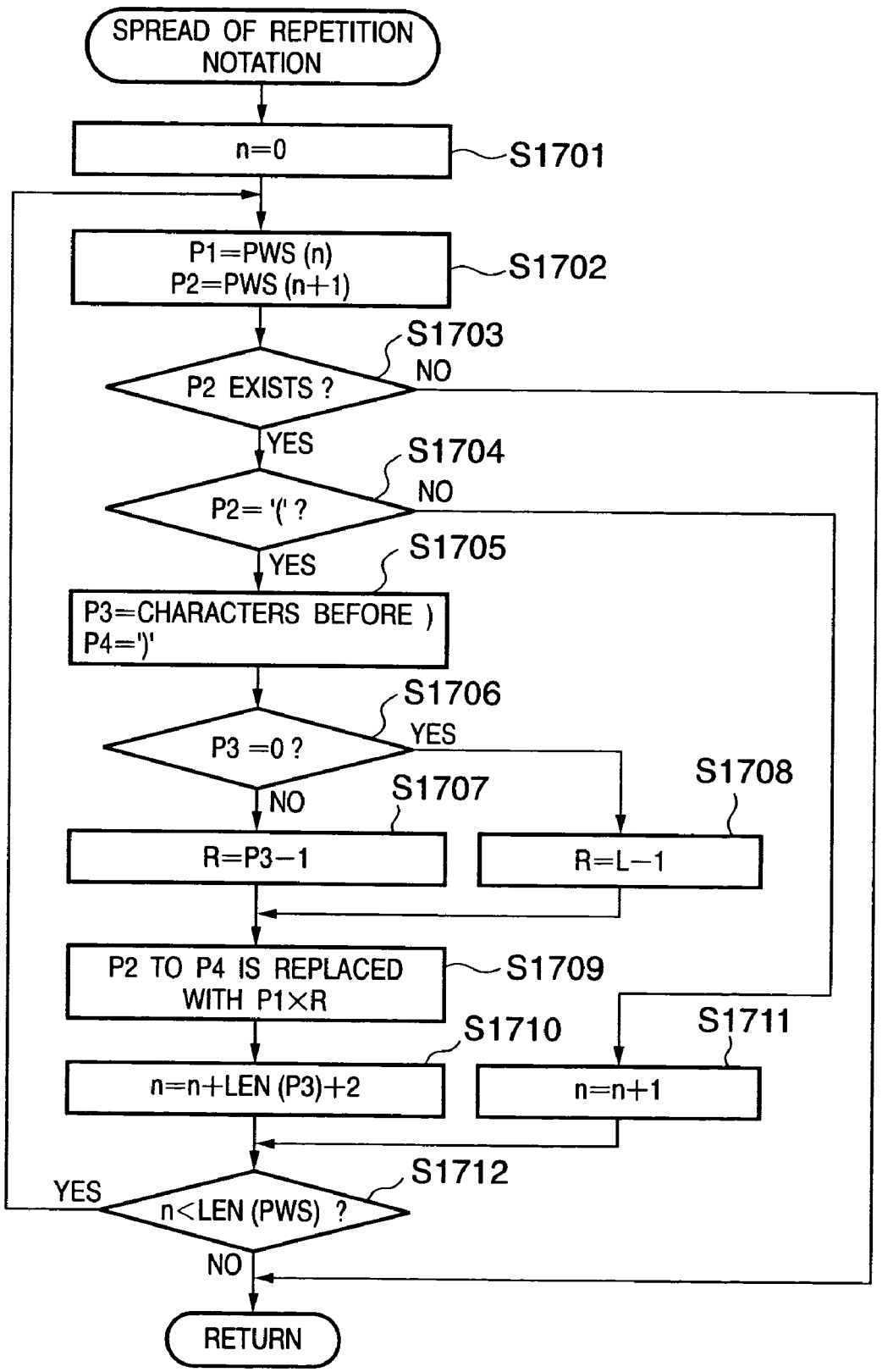
FIG. 17 is a flowchart showing a flow of data processing in a second embodiment of the present invention.

FIG. 17 shows a flowchart showing the follow of the repetition notation spreading processing performed at step S1303. In the repetition notation spreading processing, it is determined whether the repetition number of a repetition notation found by search is 0 for the picture words of all the entries in the data table. If the repetition number is 0, the number of characters of the variable-length data acquired at the above picture spreading processing minus 1 is acquired as the spread number. Otherwise, the repetition number of the repetition notation minus 1 is acquired as the spread number. Consequently, the character string in the repetition notation is replaced with as many target picture characters as the spread number of the repetition notation.

First, a loop variable n is initialized to 0 (step S1701). The n-th character of PWS of the entry acquired at step S1602 is set for P1, the (n+1)-th character for P2 (step S1702). It is then determined whether the P2 has been acquired (step S1703). If it has not been acquired, the process ends. Otherwise, it is determined whether P2 is a repetition number starting character "(" (step S1704). If it is "(", the character string before a repetition number ending character ")" is set for the variable P3, and the ")" for the variable P4 (step S1705). It is then determined whether the number of P3 (necessarily 0 or an integer above 0) is "0" (step S1706). If it is not "0", a variable R is set for the number of P3 minus 1 (step S1707), and otherwise, the R is set for L minus 1 (step S1708). Consequently, the character string from the character P2 to the character P4 in the character string PWS is replaced with as many characters P1 as R (step S1709).

The number of characters of P3 and the repetition character 2 is added to n (step S1710). If P2 is determined not to be "(" at step S1704, 1 is added to n (step S1711). It is then determined whether n is smaller than the number of characters of PWS (step S1712). If it is smaller, the process returns to step S1702. The steps S1702 to S1712 are repeated until n is identical to the number of characters of PWS at step S1712 or until the (n+1)-th character of PWS cannot be acquired any more at step S1703, and the process ends.

Figure 18:
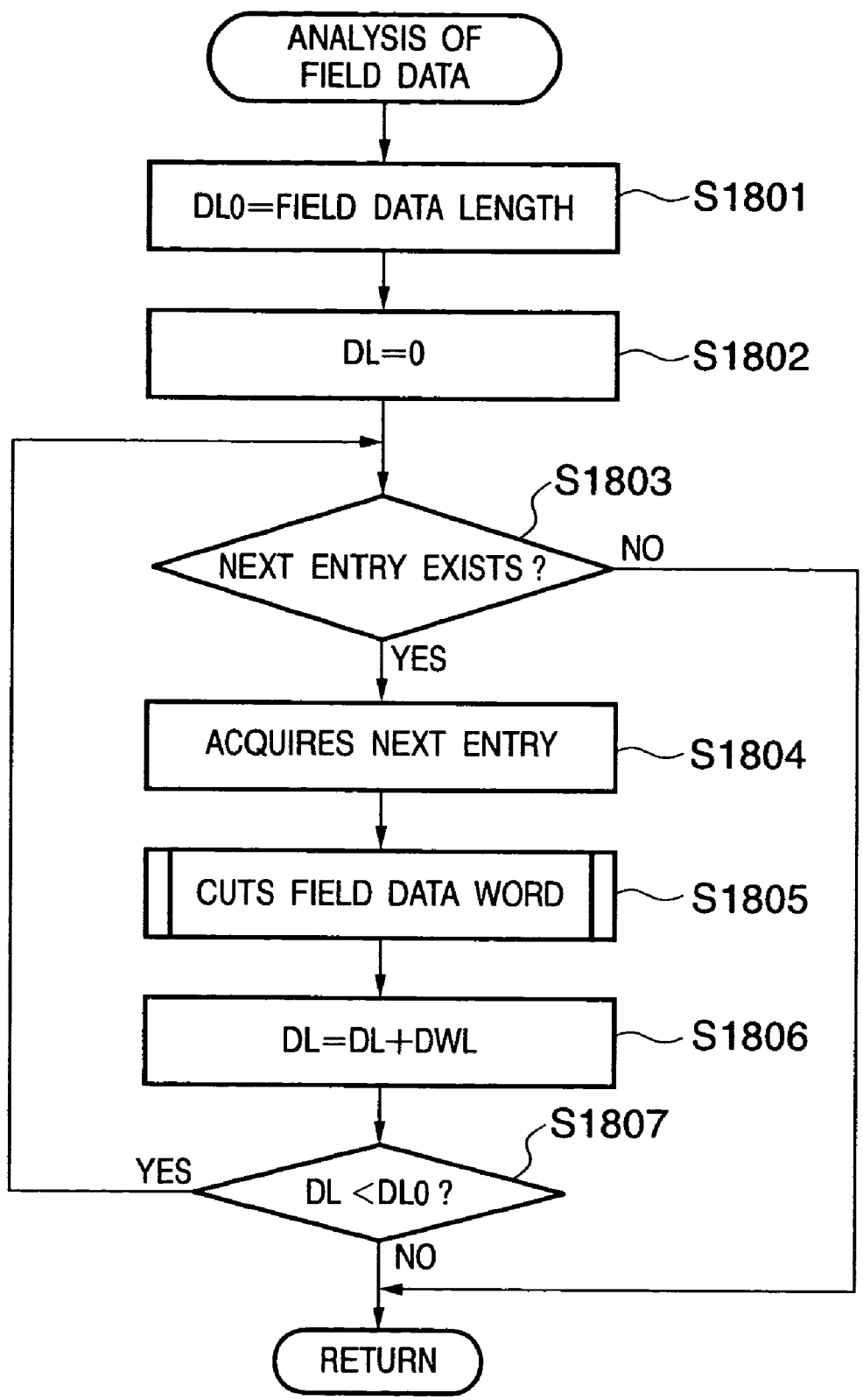
FIG. 18 is a flowchart showing a flow of data processing in a second embodiment of the present invention.
Figure 13:
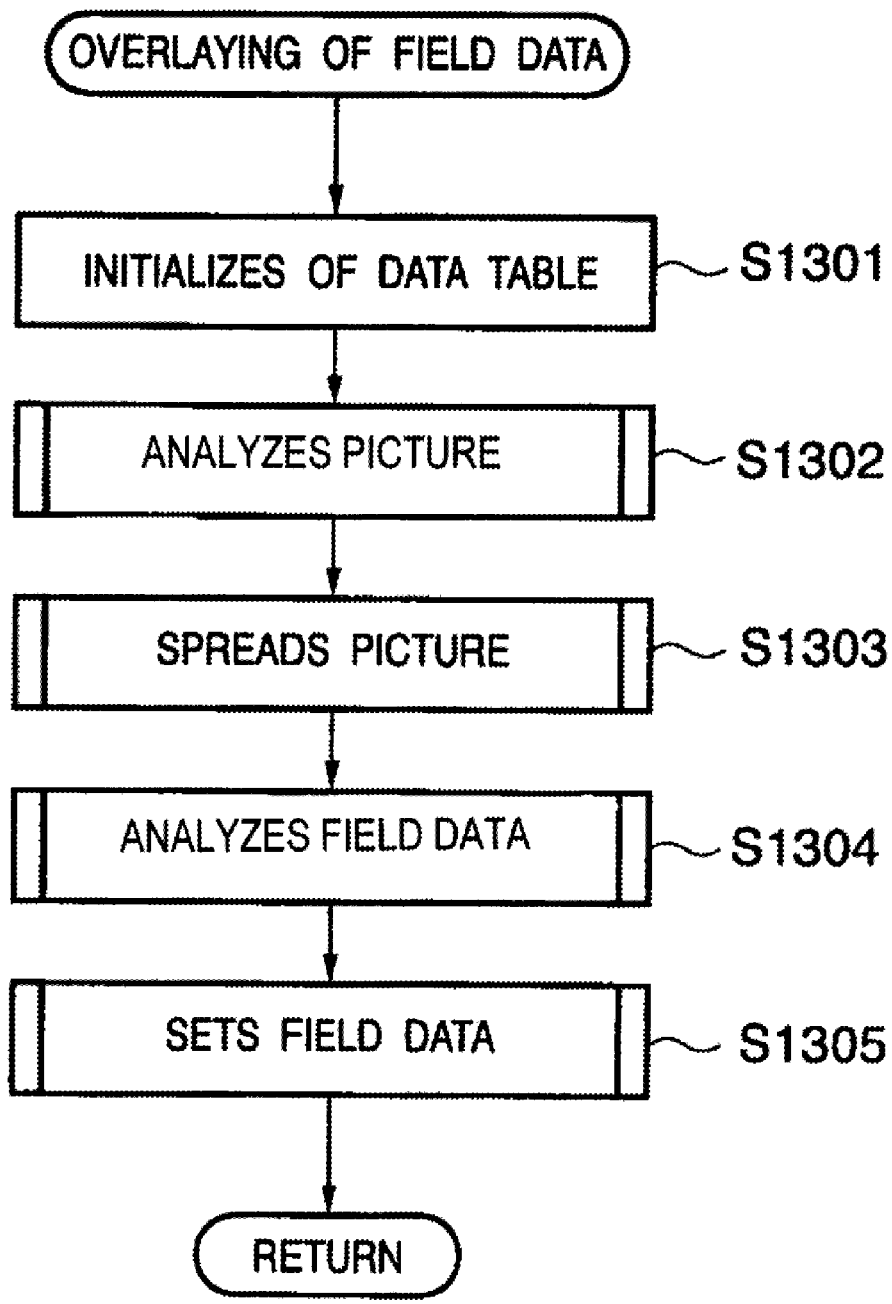

FIG. 18 shows a flowchart showing the flow of the field data analyzing processing performed at step S1304. In the field data analyzing processing, field data words are cut from unprocessed characters of the field data for the picture words of all the entries in the data table and stored as field data words in the data table.

First, DL0 indicating the number of characters of the field data acquired at step S202 is set (S1801), and a variable DL indicating the number of the processed characters of the field data is initialized to 0 (step S1802).

It is then determined whether the first entry exists in the data table (step S1803). If it does not exist, the process ends. If the entry exists, it is acquired (step S1804). A field data word is cut from the unprocessed DL-th (0: origin) and subsequent characters of the field data. The character string is set for a field data word DWS of the entry acquired at step S1602 (step S1805), and DWL is added to DL (step S1806). It is then determined whether DL is smaller than DL0 (step S1807). If it is smaller, the process returns to step S1803.

The steps S1803 to 1807 are subsequently repeated until there is no data table or until all the field data has been processed, and the process ends. When the process ends, a character string should be set for the field data word of each entry in the data table.

As apparent from the above description, using a repetition notation allows reduction in the number of the characters of an input picture to be set, thereby facilitating input on the input picture setting screen and reducing errors in inputting the number of characters even when the number of characters of field data is large.

In addition, it is possible to overlay field data stored in a data source without processing the data even when the number of characters of the field data is variable.

Third Embodiment

The present invention can be applied to a system configured by multiple pieces of equipment (for example, host computer, interface equipment, reader, and printer) or to a device consisting of a single piece of equipment (for example, copying machine, and facsimile machine).

It will be apparent that the object of the present invention can be achieved by providing a system or a device with a storage medium, to which program codes of a software implementing the functions of the embodiments are recorded, so that the computer (or CPU or MPU) of the system or the device reads and executes the program codes stored in the recording medium.

In this case, the program codes themselves, which are read out from the recording medium, implement the functions of the above embodiments, and the recording medium storing the program codes constitutes the present invention.

As the storage medium for providing the program codes, the following can be used: floppy© disk, hard disk, optical disk, magneto-optical disk, CD-ROM, CD-R, magnetic tape, non-volatile memory card, ROM, etc.

It will be apparent that the embodiments of the present invention include not only a case where a computer executes the program codes read out to implement the functions of the embodiments but also a case where the OS (operating system) operating on the computer executes a part or all of the actual processings based on the directions by the program codes to implement the functions of the embodiments.

Furthermore, it will be apparent that the embodiments of the present invention include a case where the program codes read out from the storage medium are written into memory provided in a function extension board inserted into the computer or a function extension unit connected to the computer, and then the CPU provided in the function extension board or function extension unit executes a part or all of the actual processings based on the directions by the program codes to implement the functions of the embodiments.

The present invention is not limited to the above embodiments and various changes and modifications can be made within the spirit and scope of the present invention. Therefore, to appraise the public of the scope of the present invention, the following claims are made.

What is claimed is:

1. A form processing apparatus for overlaying received data from a database file onto a field in a form, the form processing apparatus comprising:

setting means for accepting a user's input of a character string, and for setting the accepted character string for the field, wherein the character string is composed of type specification characters, which indicate a format of data which the form processing apparatus is able to receive, and wherein the number of the type specification characters indicates the length of the data;

determining means for determining the kind of each type specification character in order from the top of the type specification characters composing the set character string;

first getting means for getting plural words which are composed of the type specification characters on the basis of the determined kind of each type specification character, by determining whether the type specification character is composing a same word which is composed of the previous type specification character if the determined kind of the type specification character is same as the kind of the previous type specification character, and also by determining whether the type specification character is composing a different word from the word which is composed of the previous type specification character if the kind of the determined type specification character is different from the kind of the previous type specification character;

counting means for counting the number of type specification characters composing each gotten word;

second getting means for getting plural data by dividing the received data into the plural data in order from the top of the received data so that the length of $k^{th}$ gotten data is the same as the number of the type specification character composing the $k^{th}$ word gotten by the first getting means; and, overlaying means for overlaying each data gotten by said second getting means onto a position in which each corresponding word is set in the field.

2. A form processing method of overlaying received data from a database file onto a field in a form, the form processing method comprising:

a setting step of accepting a user's input of a character string, and setting the accepted character string for the field, wherein the character string is composed of type specification characters, which indicate a format of data which the form processing apparatus is able to receive, and wherein the number of the type specification characters indicates the length of the data;

a determining step of determining the kind of each type specification character in order from the top of the type specification characters composing the set character string;

a first getting step of getting plural words which are composed of the type specification characters on the basis of the determined kind of each type specification character, by determining whether the type specification character is composing a same word which is composed of the previous type specification character if the determined kind of the type specification character is same as the kind of the previous type specification character, and also by determining whether the type specification character is composing a different word from the word which is composed of the previous type specification character if the kind of the determined type specification character is different from the kind of the previous type specification character;

counting step of counting the number of type specification characters composing each gotten word;

a second getting step of getting plural data by dividing the received data into the plural data in order from the top of the received data so that the length of $k^{th}$ gotten data is same as the number of the type specification character composing the $k^{th}$ word gotten in the first getting step; and, an overlaying step of overlaying each data gotten in said second getting step onto a position in which each corresponding word is set in the field.

* * * * *

UNITED STATES PATENT AND TRADEMARK OFFICE
CERTIFICATE OF CORRECTION

PATENT NO. : 7,200,811 B1
APPLICATION NO. : 10/627614
DATED : April 3, 2007
INVENTOR(S) : Keiichi Takashima It is certified that error appears in the above-identified patent and that said Letters Patent is hereby corrected as shown below:

On the Title Page
[56] REFERENCES CITED

Pg 2 Col 2 Other Publications
    Line 16, after "Microsoft Excel," "pp. 223-234" should read --pp. 222-234--.
    Line 5, after "Thistelwaite," "WWW, 5," should read --WWW5,--.

SHEET 13 (As shown in attached)

Fig. 13, "ANALYSES" should read --ANALYZES-- (both occurrences).

COLUMN 1

Line 25, "filed" should read --field--.
    Line 42, "devise" should read --devise modifications--.

COLUMN 3

Line 12, "and" should be deleted.
    Line 13, "mouse," should read --mouse, and--.

COLUMN 4

Line 38, "step 203" should read --step S203--.

UNITED STATES PATENT AND TRADEMARK OFFICE
CERTIFICATE OF CORRECTION

PATENT NO. : 7,200,811 B1
APPLICATION NO. : 10/627614
DATED : April 3, 2007
INVENTOR(S) : Keiichi Takashima It is certified that error appears in the above-identified patent and that said Letters Patent is hereby corrected as shown below:

COLUMN 6

Line 16, "filed" should read --field--.

COLUMN 7

Line 55, ""( )" should read --"( )"--.

COLUMN 10

Line 10, "filed" should read --filed--.
Line 33, "follow" should read --flow--.

COLUMN 11

Line 23, "1807" should read --S1807--.

Signed and Sealed this

Fifteenth Day of January, 2008

JON W. DUDAS
*Director of the United States Patent and Trademark Office*